Jan. 18, 1938.  S. B. MARTIN ET AL  2,105,747
PIPE OR ROD COUPLING
Filed July 22, 1936   2 Sheets-Sheet 1
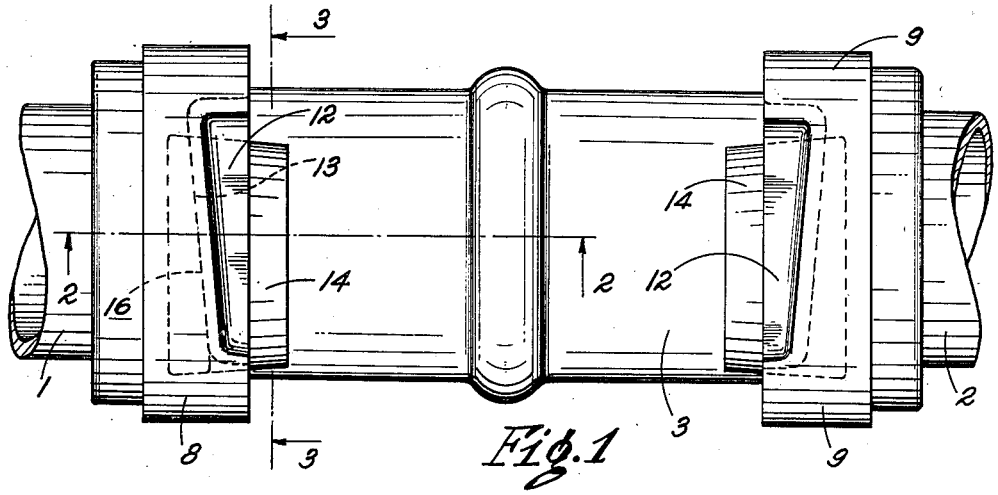
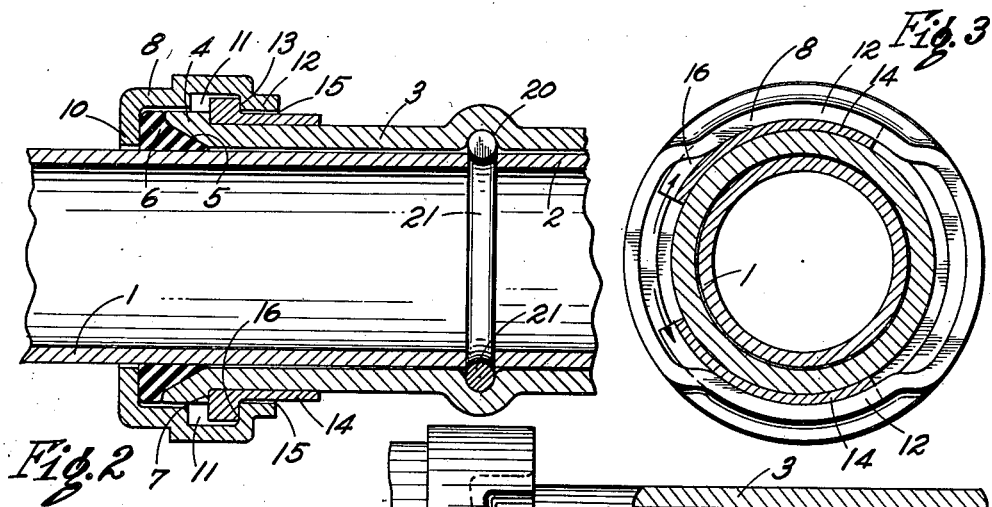
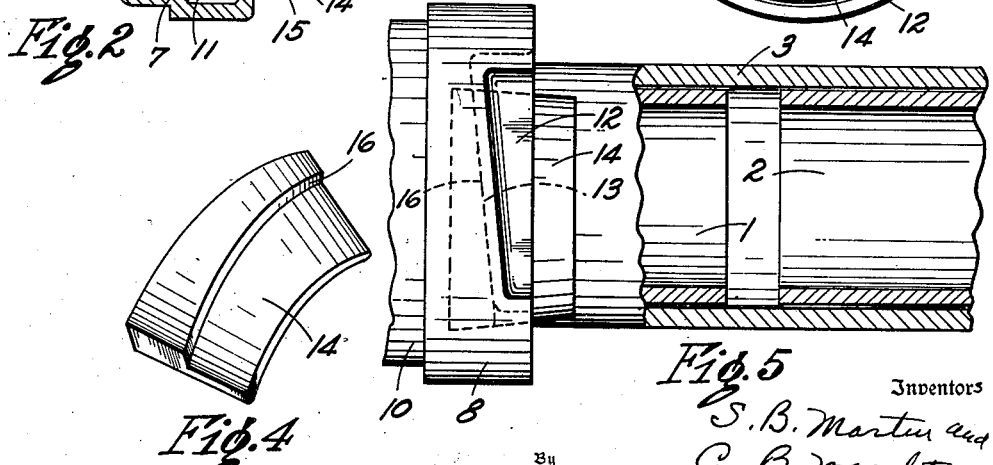
Inventors
S. B. Martin and
C. B. Waechter,
Hawgood & Van Horn
Their Attorneys Jan. 18, 1938.  S. B. MARTIN ET AL  2,105,747
PIPE OR ROD COUPLING
Filed July 22, 1936  2 Sheets-Sheet 2
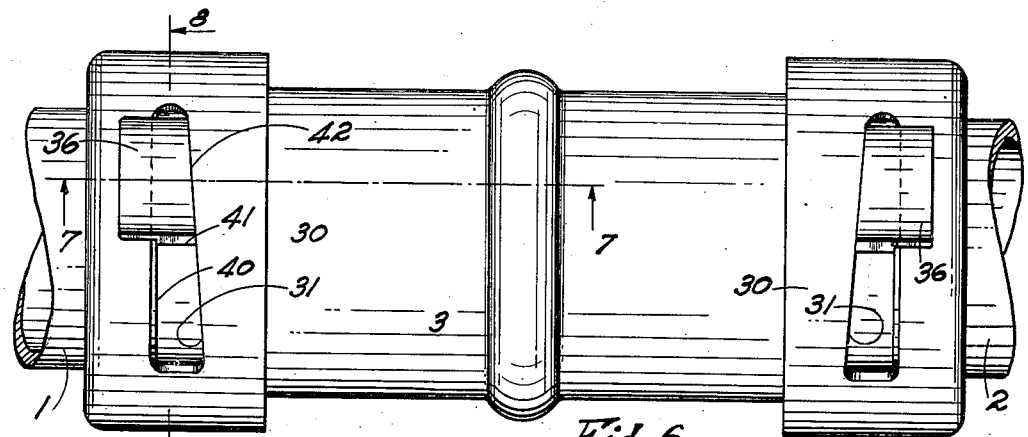
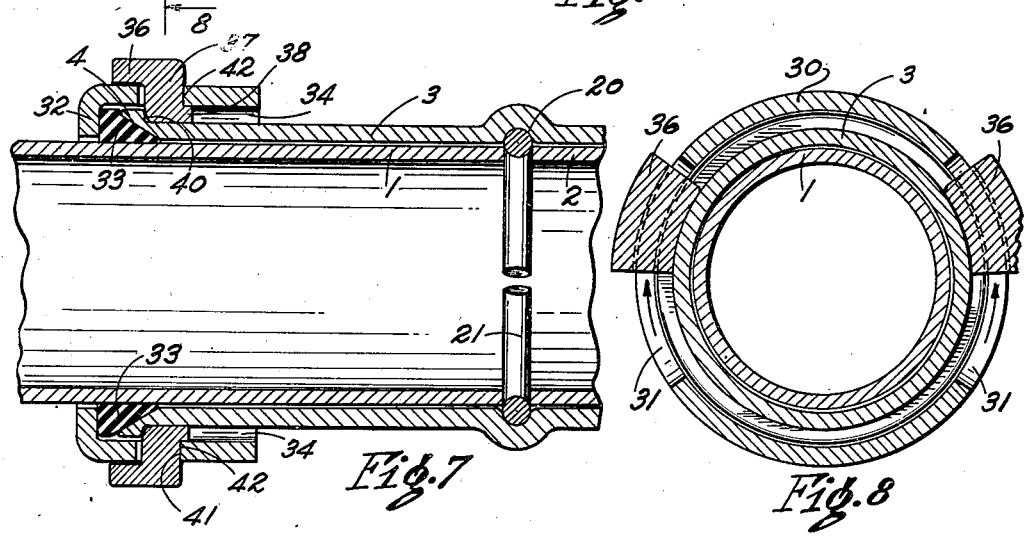
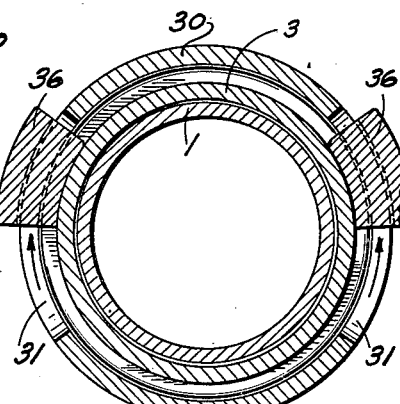
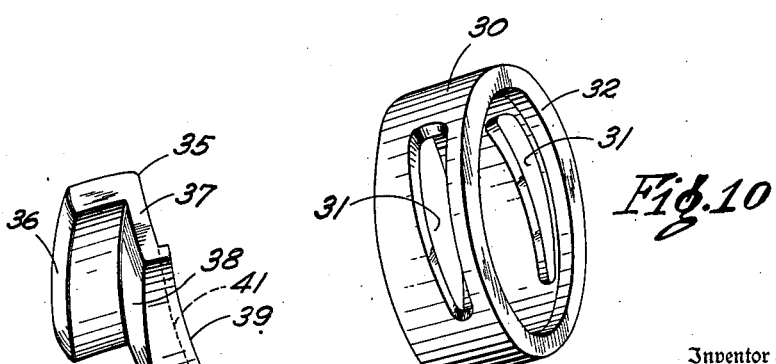

Patented Jan. 18, 1938

2,105,747

UNITED STATES PATENT OFFICE 2,105,747

PIPE OR ROD COUPLING

Stoddard B. Martin, Lakewood, Ohio, and Charles Bernard Waechter, Bradford, Pa.

Application July 22, 1936, Serial No. 91,926

5 Claims. (Cl. 285—196)

Our invention is an improvement in pipe and rod couplings and relates more particularly to such couplings which may quickly be assembled and disassembled on adjacent pipe or rod sections, and which require no bolts or threaded members to make a tight and fluid sealed union.

We have found that many difficulties have been experienced in manufacturing a bolted type of coupling strong enough to stand up under the full bolt load without considerable deformation or distortion of the followers. This is due to the necessary overhang or leverage of the force applied by the bolts through the medial portion of the gasket cross section.

By our invention, we have eliminated this undesirable and faulty condition.

In the bolted type, the pressure applied by the bolts to the packing member is usually uniform around the gasket, even though the pipe ends are not accurately in alignment in the union. In the threaded type of coupling, we have found that compression of the packing is uniform only when the pipe ends are in alignment. Any deviation from accurate alignment of the pipe ends results in high and low pressure areas and consequently in leaky unions.

By our invention, we are enabled to construct a coupling in which the resultant compression of the packing is uniform in any position of the pipe ends. This condition will more readily appear from the following description from which it will be found that our invention contemplates the use of independent wedges or the like located at spaced intervals around the coupling circumference, and which may be driven home independently one of the other.

Furthermore, by our invention, we are enabled to apply the forces of compression to the packing longitudinally of the coupling and at the same time close to the outer edge of the ring. This is important because it insures a uniform distribution of the forces of compression around the packing ring to make a more perfect fluid tight seal, regardless of whether the pipe ends are accurately aligned to the coupling body or to one another. By increasing the number of wedges or keys in our invention, greater clamping pressures may be applied to the packing.

One of the objects of the invention is to provide a joint or coupling of this character wherein the ends of adjacent pipe or rod sections may be joined together without the use of bolts or threads, and in the case of pipes, when said sections are so joined together, an effective fluid tight seal will be obtained therebetween, thus avoiding leakage at the joint or coupling.

Another object of the invention is to construct a coupling of this character wherein the packing members will be acted upon through pressure in a longitudinal direction or axially of the pipe ends and in this manner thereby assuring a positive seal at the joint when coupling the ends of a pipe, there being no possibility of the members forming the joint becoming loose or the pipe ends separating from each other.

A further object of the invention is to construct a coupling of this type wherein it is possible to maintain flexibility of the pipe ends when desired, without bad effect at the joint.

A still further object of the invention resides in the provision of a coupling of the character described which is extremely simple in construction, thoroughly reliable and effective in operation, strong, durable in use, and which by its construction and arrangement of parts eliminates the necessity for the use of a pipe wrench or the like, in that the wedging action set up by the wedge keys can be accomplished by hammering the keys in place. The device embodying our invention is inexpensive to manufacture and easy to install.

Other objects and advantages will readily appear from the following description of several embodiments of our invention, reference being made to the accompanying drawings in which like reference characters are employed to designate like parts throughout the same.

In the drawings:

Figure 1 is an elevation of one embodiment of the invention and shows the same applied in use for coupling the adjacent ends of two pipe sections together;

Figure 2 is a section taken on line 2—2 of Figure 1;

Figure 3 is a transverse section taken on line 3—3 of Figure 1;

Figure 4 is a detail perspective view of one of the wedging keys;

Figure 5 is a side elevation of another embodiment of our invention, shown partly in section. This embodiment is similar to the form shown in Figures 1 to 4 inclusive, but differs in that it is not equipped with the stop ring carried internally of the connecting sleeve.

Figure 6 is a side elevation of a third embodiment of the invention;

Figure 7 is a section taken on line 7—7 of Figure 6;

Figure 8 is a section taken on line 8—8 of Figure 6;

Figure 9 is a perspective view of the type of wedge block used in connection with this embodiment of this invention; and Figure 10 is a perspective view of a form of collar also used in connection with this form of the invention.

Referring now to the drawings in detail, and more particularly to Figures 1 to 4 inclusive which illustrate one form of the invention, the end portions of adjacent pipe sections are indicated at 1 and 2.

In carrying out this form of our invention we provide a cylindrical sleeve 3 having each of its ends struck up at 4 to provide an annular seat 5, the wall of which converges inwardly of the sleeve to accommodate the annular packing ring 6 which is carried by each pipe section and seated against the inclined wall 5 when the sections are coupled together within the sleeve. The portion 4 also provides a flange 7. The packing rings may be of rubber or any other suitable packing material and embrace the pipe ends 1 and 2 when the latter are telescoped into the sleeve 3 for joining or coupling the same.

Removably fitted over the telescoped pipe ends and sleeve ends respectively, are the collars 8 and 9 having inwardly turned flanges 10 and formed with internal channels 11 intermediate its ends. The portions 8, 9, and 12 of the collars are formed on substantially the same radii, but are spaced apart by the channel 11 which is preferably formed by upsetting the metal of the collar at these points or casting it in this form. As shown more clearly in Figure 1 the portions 12 are formed with inwardly projecting inclined wedge shaped walls 13, these being arranged at points substantially diametrically opposite each other and are provided for engagement with the inclined walls of the arcuate shaped keys 14 which function as followers and are introduced into the collar through the clearances 15 between the wedges 12 instruck from the collars. The keys 14 are provided with inclined surfaces 16 which when acted upon by the wedges exert a pressure upon the shoulder or flange 7 of the sleeve to draw the collar flange 10 tightly against the packing ring 6 and cause the forward inclined face of the packing ring to press tightly against the similarly inclined seat 5 of the sleeve end and the external walls of the pipe sections so that the packing ring will be compressed against the pipe end 1 and the inclined seat 5 to effect a fluid tight seal between the pipe end and the sleeve, when the keys are driven home. The operation and construction of the parts is similar at the other end of the sleeve.

In order to facilitate the assembly and disassembly of the coupling where pipe sections to be coupled are laid in a ditch or the like, we propose that the diametrically opposed wedges and keys on each end of the sleeve be arranged so that the keys may be driven home or removed respectively from a right and left hand direction. That is, in tightening the coupling at one end of the sleeve, the keys may consist of one right and one left hand wedge face and of course the struck in wedge portions of the collar at that end of the coupling may be formed as a right and left hand pair. In this manner the operator may stand above the coupling and drive home the keys from above without the necessity of rotating the coupled pipe section to get at one or the other of the keys. Furthermore by employing right and left hand wedges and keys at each end of the coupling, the pipe sections, once coupled in the manner described, will not become loosened accidentally, but will have to be forcibly removed by driving out the keys in opposite directions.

In Figure 5 we have shown a construction similar to that shown in Figures 1 to 4, but we have eliminated the stop located in the sleeve.

In Figures 1 to 4 inclusive this stop may consist of an annular seat or groove 20 formed internally of the sleeve at approximately its mid section and adapted to receive a spring metal annulus 21 which is preferably in the form of a stiff split ring. The ring 21 when seated in the groove projects inwardly of the inner walls of the sleeve for about one half of its cross sectional diameter and thus provides an internal stop against which the edges of the pipe ends may abut as shown in Figure 2.

By means of this construction the pipe ends may be inserted equally within the sleeve thus assuring a better location within the sleeve of the nearly abutting pipe ends.

In Figures 6 to 10 inclusive we have illustrated a further embodiment of the present invention, which is similar in many respects to that already described. However, in the present form the collars 30 are provided with wedge shaped slots 31, preferably reversed to one another as shown in Figure 10 to enable the coupling to be assembled and disassembled more easily as has hereinbefore been described.

The collars 30 include a ring like body having an inwardly turned annular flange 32 at their outer ends for engagement with the packing ring 33. The body of the collar is of sufficient diameter that its free or inner end is normally spaced from the outer walls of the sleeve to provide clearances 34.

According to this form of our invention we employ a plurality of keys 35, one of which is shown in detail in Figure 9. Each key is of arcuate shape and is provided with a flange 36 which lies over the outer surface of the collar, an intermediate portion of varying thickness to provide a cam 37 and an internal flange 39 which is adapted to lie between the collar 30 and the sleeve 3 in the clearances 34.

The surface 38 of the key 35 engages the adjacent wall 40 of the flange 4, as is clearly illustrated in Figure 7 while the reverse side or inclined surface 41 of the key slidably engages the adjacent inclined wall 42 of the inclined slot 31, thereby exerting a force of compression upon the gasket 33 by moving the sleeve 3 and the collar substantially axially together.

It is to be noted that the inclined walls of the slots 31 (see Figure 10) are opposed so that the keys may be inserted from above if desired and driven home in opposite directions of rotation from above. This arrangement materially increases the ease of assembly and disassembly of the coupling or joint, especially where there is not ready access to these parts when the pipe is to be coupled where it lies.

Various changes may be made in the details of construction and arrangement of parts of our invention without departing from the spirit thereof or the scope of the appended claims.

We claim:

1. A coupling of the character described comprising a sleeve for accommodating pipe or rod ends, packing means abutting opposite ends of the sleeve, followers overlying said packing means and sleeve at each end thereof said followers being engageable with the packing means to compress the same against the respective pipe or rod ends and against the sleeve ends in fluid tight relation, said followers having reversed wedge shaped surfaces and members having surfaces cooperating with the said surfaces of the followers and the sleeve ends for exerting pressure upon the packing axially of the pipe or rod ends.

2. A coupling of the character described comprising a sleeve for accommodating pipe or rod ends, packing means abutting opposite ends of the sleeve, followers overlying said packing means and sleeve at each end thereof said followers being engageable with the packing means to compress the same against the respective pipe or rod ends and against the sleeve ends in fluid tight relation, said followers having inclined surfaces, and members having surfaces cooperating with the said inclined surfaces of the followers and the sleeve ends for exerting pressure upon the packing axially of the pipe or rod ends, said members having portions lying between the sleeve and the respective followers.

3. A coupling of the character described comprising a sleeve for accommodating pipe or rod ends, packing means abutting opposite ends of the sleeve, followers overlying said packing means and sleeve at each end thereof said followers being engageable with the packing means to compress the same against the respective pipe or rod ends and against the sleeve ends in fluid tight relation, said followers respectively having reversed inclined surfaces of the followers and the sleeve ends for exerting pressure upon the packing axially of the pipe or rod ends, said members having portions lying between the sleeve and the respective followers.

4. A coupling comprising a sleeve for accommodating pipe or rod ends, packing means abutting opposite ends of the sleeve, collar members adapted to overlie the packing and adjacent sleeve ends and having inclined walls, and individually operable key members having inclined walls for engagement with the respective inclined walls of said collar members, whereby said packing is subject to compressive forces when said key is moved circumferentially of said sleeve.

5. A coupling comprising a sleeve for accommodating pipe or rod ends, packing means abutting an end of the sleeve, a collar member adapted to overlie the packing and adjacent sleeve end and having at least one circumferential opening in its overlying portion, one of the walls of said opening being disposed in a plane intersecting a transverse plane of the collar, and a wedge member having a portion operating in said opening and adapted to cause said packing to be compressed when the wedge member is driven in a circumferential direction with respect to the sleeve.

CHARLES BERNARD WAECHTER.
STODDARD B. MARTIN.